United States Patent [19]
Rench et al.

[11] Patent Number: 5,652,593
[45] Date of Patent: Jul. 29, 1997

[54] METHOD AND APPARATUS FOR GUIDING A MACHINE

[75] Inventors: Quentin H. Rench, Racine, Wis.; Stephen Jacobs, Bayside, Calif.

[73] Assignee: Von Schrader Company, Racine, Wis.

[21] Appl. No.: 315,261

[22] Filed: Sep. 29, 1994

[51] Int. Cl.$^6$ .................................................. G01S 3/02
[52] U.S. Cl. ........................... 342/458; 367/127; 901/1; 901/47
[58] Field of Search .................... 342/458, 387, 342/46; 356/5.01, 5.05, 3.14, 141.3; 367/2, 127; 901/1, 47

[56] References Cited

U.S. PATENT DOCUMENTS

| | | | |
|---|---|---|---|
| 2,434,644 | 1/1948 | Fairweather | 177/352 |
| 2,743,429 | 4/1956 | Erdman et al. | 340/1 |
| 3,009,271 | 11/1961 | Kuehne et al. | 37/143 |
| 3,458,853 | 7/1969 | Daniels et al. | |
| 3,504,334 | 3/1970 | Turnage, Jr. | 340/16 |
| 3,680,121 | 7/1972 | Anderson et al. | 343/112 TC |
| 3,792,424 | 2/1974 | Nakatsuji | 340/6 R |
| 4,012,588 | 3/1977 | Davis et al. | 178/18 |
| 4,055,830 | 10/1977 | Wilson et al. | 340/16 R |
| 4,114,711 | 9/1978 | Wilkins | 180/6.5 |
| 4,357,672 | 11/1982 | Howells et al. | |
| 4,433,334 | 2/1984 | Caputi, Jr. | 343/450 |
| 4,530,077 | 7/1985 | Dorr | 367/140 |
| 4,700,427 | 10/1987 | Knepper | 15/319 |
| 4,710,020 | 12/1987 | Maddox et al. | 356/1 |
| 4,758,691 | 7/1988 | DeBruyne | 178/19 |
| 4,772,764 | 9/1988 | Dorr | 178/18 |
| 4,799,062 | 1/1989 | Sanderford, Jr. et al. | 342/387 |
| 4,939,522 | 7/1990 | Newstead et al. | 342/387 |
| 4,980,871 | 12/1990 | Sieber et al. | 367/127 |
| 5,386,285 | 1/1995 | Asayama | |

*Primary Examiner*—Theodore M. Blum
*Attorney, Agent, or Firm*—Jansson & Shupe, Ltd.

[57] ABSTRACT

The disclosure involves a method for guiding a machine within an area. Such method includes the steps of triggering an acoustic locating signal from a stationary "beacon-type" base module to a receiver on the machine. The method is applicable for one-beacon, two-receiver and two-beacon, one-receiver applications. A related apparatus also includes a device for emitting a trigger signal and a device for determining the time elapsed between transmission and reception of the locating signal. An operating principle involves computing the module-to-machine distance by determining the "time of flight" of such signal. The machine is steered along a path, the locus of which is defined by an equation.

17 Claims, 5 Drawing Sheets

METHOD AND APPARATUS FOR GUIDING A MACHINE

FIELD OF THE INVENTION

This invention relates generally to communications and, more particularly, to communications of the type used in guidance systems for land-based machines.

BACKGROUND OF THE INVENTION

So-called "robotic" machines are coming into use for a wide variety of applications. Robotic agricultural machines, underground mining machines and floor cleaning machines have received recent publicity. The techniques used to guide robotic machines are nearly as varied as the machines themselves. Examples of such techniques include scanning beam navigation with remotely-mounted "targets" such as reflectors or bar codes, inertial navigation using ring laser gyroscopes, multi-beacon triangulation and others.

The patent literature depicts a variety of techniques for machine guidance. For example, U.S. Pat. No. 4,939,522 (Newstead et al.) involves a method and system for monitoring vehicle location. Such system uses two or more sweeping transmitters, the signal from each having a null in the signal wavefront. The system shown in U.S. Pat. No. 3,680,121 (Anderson et al.) uses pulses of modulated RF energy emitted from a vehicle. Multiple receiving stations compare the time of receipt of a pulse with a standard reference signal to compute the distance between the vehicle and the receiving station.

While the apparatus of U.S. Pat. No. 4,012,588 (Davis et al.) is used to determine position of a stylus (rather than guide a machine), the technique is of some interest. The stylus periodically emits a sound signal detected by two beacons. The signal transit time is measured to compute the stylus coordinates. In the alternative, the beacons emit sound waves detected by the stylus and the transit times of such sound waves are computed. The apparatus of U.S. Pat. No. 4,758,691 (DeBruyne) operates in a similar manner.

Although not involving machine guidance, the "determinator" shown in U.S. Pat. No. 2,434,644 (Fairweather) is interesting in the way it locates a source of acoustic shock waves. The time at which such wave arrives at each of two microphones is used to compute the angle between a reference axis and a radian pointing in the direction of the source.

And styluses and radio-frequency transmitters are not the only types of devices used to transmit energy sound waves. U.S. Pat. No. 4,530,077 (Dorr) depicts a cone associated with a sound-producing transducer. A portion of the cone is covered with sound-absorbing material so that when the transducer is actuated, the sound wave propagated from the cone is "shaped."

While the prior art guidance systems have been generally satisfactory for their intended purposes, they are not without disadvantages. For example, guidance systems involving ring laser gyroscopes are undoubtedly too costly and too complex in operation and maintenance for use with machines costing a few thousand dollars and operated by non-technical persons.

A disadvantage of scanning systems involving remote targets, e.g., bar code "stickers" on walls, is that the area in which the machine is to operate must first be rather extensively prepared or "set up." Sometimes, such setup work involves taking and recording certain measurements. Other systems, e.g., that of the Newstead et al. patent mentioned above, contemplate that such systems will be used at a particular location or area and will not be moved from place to place.

A method and apparatus for guiding a machine which addresses and overcomes some of the aforementioned disadvantages would be an important advance in the art.

OBJECTS OF THE INVENTION

It is an object of the invention to provide an improved method and apparatus for guiding a machine which overcome some of the problems and shortcomings of the prior art.

Another object of the invention is to provide an improved method and apparatus for guiding a machine which are suitable for use with relatively inexpensive machines.

Another object of the invention is to provide an improved method and apparatus for guiding a machine wherein such method and apparatus are easy to use.

Yet another object of the invention is to provide an improved method and apparatus for guiding a machine which may be readily set up and used in a variety of areas.

Another object of the invention is to provide an improved method and apparatus for guiding a machine which are particularly applicable to robotic carpet cleaning machines. How these and other objects are accomplished will become more apparent from the following descriptions and from the drawing.

SUMMARY OF THE INVENTION

An aspect of the invention involves a method for guiding a machine within an area such as a room. Such method includes the steps of triggering a locating signal from a base module to the machine and computing the distance between such module and the machine. The triggering step preferably includes sending a trigger signal from the machine to the base module to "prompt" transmission of the locating signal. The inventive apparatus has a device for measuring elapsed time and the triggering step also includes setting the device at zero elapsed time at the instant the trigger signal is sent. (While the time measuring device could be a clock in the conventional sense, a highly preferred device measures the duration of time intervals, i.e., elapsed time, between two events. Such device is more analogous to a stop watch than to a clock.)

A high-speed trigger signal, e.g., light or other type of electromagnetic radiation, is preferred so that there is substantially no time lapse between when the time-keeping device starts counting from zero and when the base module receives the trigger signal and simultaneously emits a locating signal. And since a feature of the invention involves computation of the "time-of-flight" of the locating signal, a relatively slow-moving locating signal such an acoustic signal is preferred.

In a more specific aspect, the new method is carried out by a machine which includes spaced first and second receivers for detecting a signal from the base module. In this "two-receiver, one-beacon" approach, the method includes the steps of determining a first time of flight of the locating signal from the base module to the first receiver and determining a second time of flight of the locating signal from the base module to the second receiver. The distance between the base module and the machine is computed.

In the two-receiver approach, the receivers define a machine axis. There is a base axis extending between the base module and the machine and the method includes the step of orienting the machine axis at a known angle with respect to the base axis, e.g., 90°. The orienting step includes moving the machine until the first time of flight and the second time of flight are substantially equal to one another. It is preferred to compute the base module-machine distance only after the machine is so oriented.

Preferably, the equipment is set up so that when such times are equal, the machine axis is parallel to a travel path along, say, a floor. The machine is then moved along the travel path and when such machine comes to the end of its "pass," the machine is turned 90° and then moved a decremental distance (preferably equal to somewhat less than the machine width) along a line substantially parallel to the base axis. The machine is then again turned and the direction of machine movement is thereby reversed. Such activity is followed by the step of moving the machine to a location at which the machine axis is again at the known angle with respect to the base axis. The machine thereby defines a "back-and-forth" or raster pattern in the area in which the machine moves.

In a "one-receiver, two-beacon" approach, the base module includes first and second spaced-apart base units. The triggering step includes triggering a first locating signal from the first base unit to the machine and triggering a second locating signal from the second base unit to the machine.

So that the first base unit has time to "answer" the trigger signal, the second locating signal is preferably triggered following a predetermined time delay after triggering the first locating signal. In a highly preferred arrangement, the base units are electrically connected together and the second locating signal is triggered by the first base unit.

The apparatus for guiding a machine includes a trigger device for emitting a trigger signal and a base module for receiving the trigger signal and transmitting a locating signal. There is also a receiver receiving the locating signal and a measuring device for determining the time elapsed between transmitting the locating signal and receiving such locating signal. Preferably, the trigger device, the receiver and the time measuring device are mounted on the machine which is being guided. In one specific embodiment, the machine is a carpet cleaning machine.

The receiver is omni-directional and one highly preferred embodiment includes a cone-shaped reflector with an apex. A disc-like signal sensor is mounted at the apex and receives signals from the reflector. In a two-receiver approach, such receivers are mounted atop the machine on a fore-and-aft beam support. In that way, each receiver is able to receive a locating signal from any direction.

And in the two-receiver configuration, the measuring device also determines the time difference between the instant at which the locating signal is received by the first receiver and the instant at which the locating signal is received by the second receiver. Further details regarding the invention are set forth in the following detailed description and in the drawing.

DETAILED DESCRIPTION OF PREFERRED EMBODIMENTS

Referring first to FIGS. 1–4, aspects of the new method and apparatus involve a stationary beacon and an omnidirectional receiver. In this specification, reference is made to a "one-beacon, two-receiver" arrangement and to a "two-beacon, one-receiver" arrangement.

Aspects of the invention are described in conjunction with a machine 10 to be guided. Such machine 10 is electrically powered by an on-board battery or "tether-like" wall-plugged cord 11. There are driving wheels 13 and in one embodiment, such wheels 13 are equipped with "wheel counters" of the type described in U.S. Pat. No. 5,038,484 (Rench et al.) which is owned by the assignee of this invention. Such patent is incorporated herein by reference.

Figure 3:
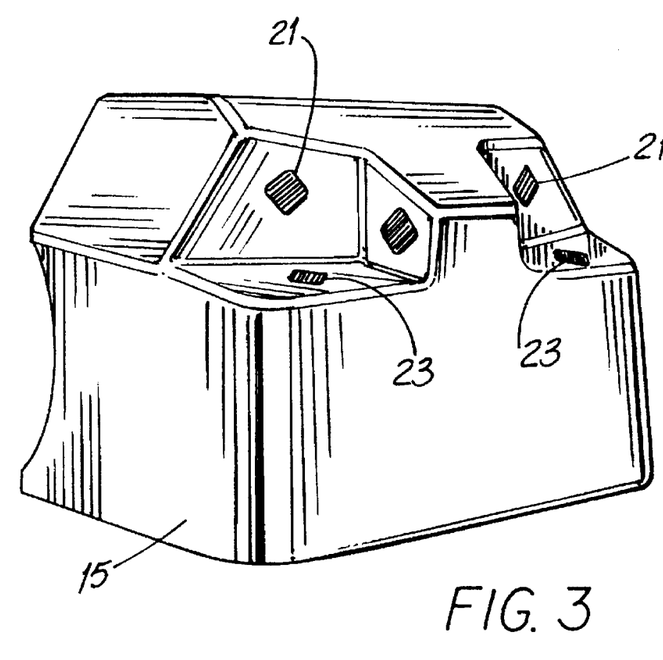
FIG. 3 is a perspective view of the lower housing of the machine of FIGS. 1 and 2.

The machine 10 has a lower housing 15 with a pair of recesses 17 and when used to clean carpets, each recess 17 has plural sonar units mounted therein. In a highly preferred arrangement, there are wall-following "side-looking" units 19, a pair of "front-looking" units 21 and a pair of "up-looking" units 23. The side-looking units 19 are useful in some guiding strategies while the front-looking units 21 signal when the machine 10 is approaching an obstruction, e.g., a wall. The up-looking units 23 help prevent the machine 10 from running into or under the edge of a table or similar structure. There is also a third "front-looking" unit 21 near the machine cowling.

Figure 1:
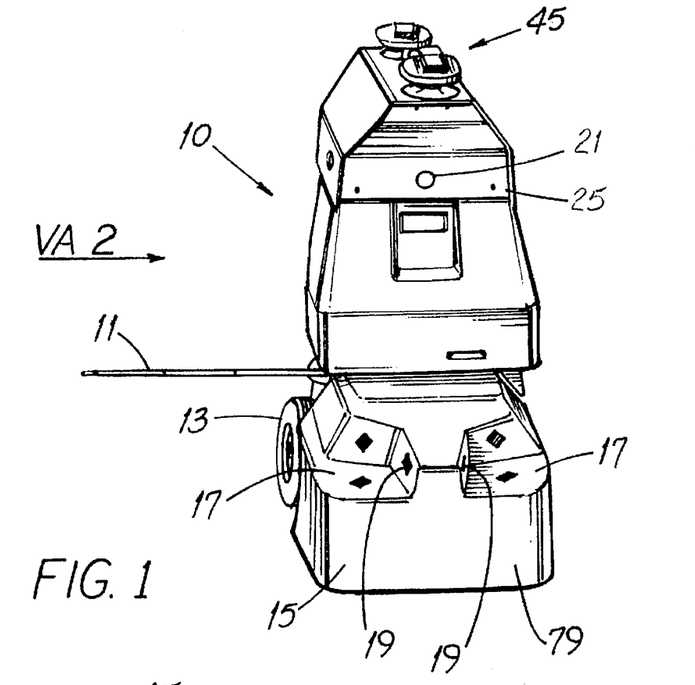
FIG. 1 is a front elevation perspective view of a guided machine.
Figure 2:
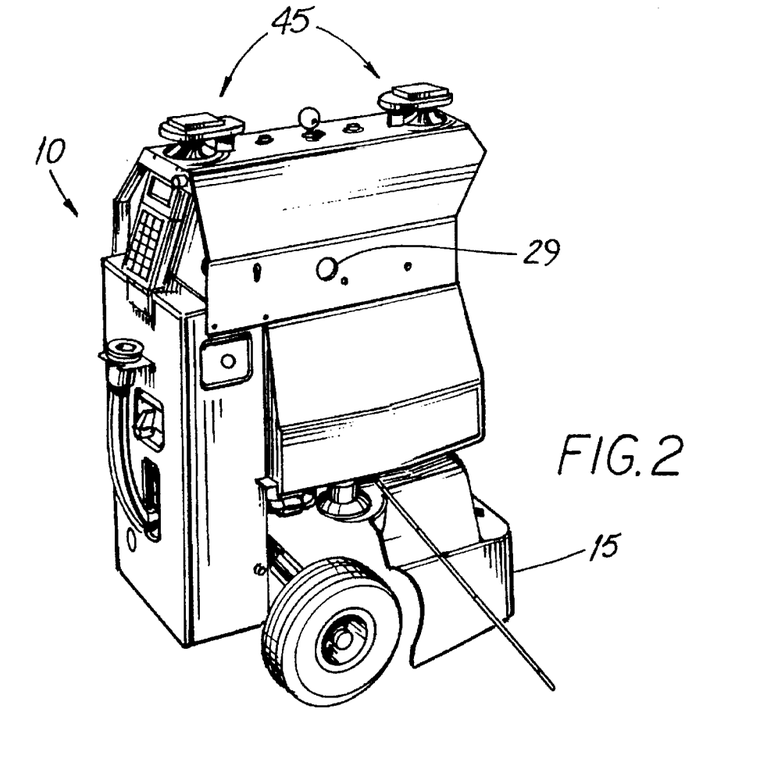
FIG. 2 is a side elevation perspective view of the machine of FIG. 1 taken generally along the viewing axis VA2 thereof.

The machine 10 also has a "transmitter" 29 for sending a trigger signal to a remote base module 31. Each such signal is a radiated pulse of extremely brief duration, i.e., a few milliseconds. In a highly preferred embodiment, the transmitter 29 includes a modulated infrared (IR) diode and sharply-focusing lens. IR light or other electromagnetic radiation (EMR), e.g., radio waves, is preferred since for machine-travelled areas of reasonable size, e.g., a few hundred or a few thousand square feet, the time required for such radiation to move from the transmitter 29 to a module 31 is essentially zero. The reason this is desirable will become apparent.

Figure 4:
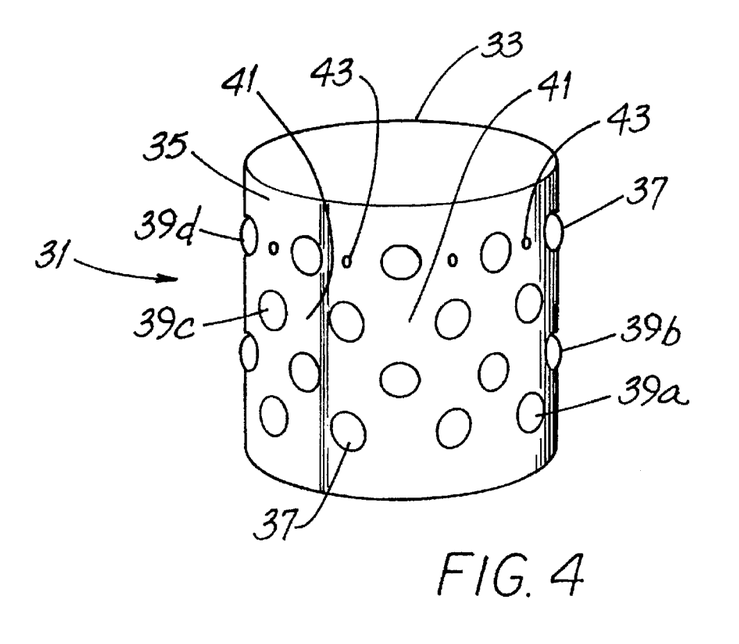
FIG. 4 is a perspective view of a base module including a single beacon.

A system base unit or beacon 33 will now be described. Referring particularly to FIG. 4, a preferred beacon 33 has a hollow generally cylindrical body 35 on which are mounted several acoustic transducers 37. (A transducer changes one form of energy, e.g., electrical, into another energy form, e.g., acoustic.) A Polaroid electrostatic transducer having a frequency of about 50 Khz has been found to be highly serviceable in the beacon 33.

The transducers 37 are mounted in circumferential rows 39a–d and the transducers 37 of a particular e.g., row 39b, row are aligned with the interstices 41 between transducers 37 of the adjacent row 39c. All of the transducers 37 are energized simultaneously and when so arranged, the beacon 33 is omnidirectional and radiates acoustic energy over substantially 360°. As described below, a beacon 33 radiating EMR instead of acoustic energy may be used but is less preferred.

Each beacon 33 also includes plural detectors 43 for sensing the EMR emitted by the transmitter 29. When the triggering signal is IR light, the detectors 43 are optical detectors. As described in more detail below, the beacon 33 energizes its transducers 37 at the instant its detectors 43 sense a trigger signal in the form of "incoming" EMR.

The beacon 33 is configured to periodically "pulse" its transducers 37 to emit a signal. Preferably, a signal is autmomatically emitted every one second or so. However, when a detector 43 senses EMR emitted by the transmitter 29, a signal is instantaneously emitted and thereafter signals are emitted at the selected interval.

A preferred embodiment of the receiver 45 used on the machine 10 will now be described. Referring further to FIG. 1 and also to FIGS. 5 and 6, the receiver 45 includes a cone-shaped reflecting body 47, the apex angle of which is about 90°.

Figure 5:
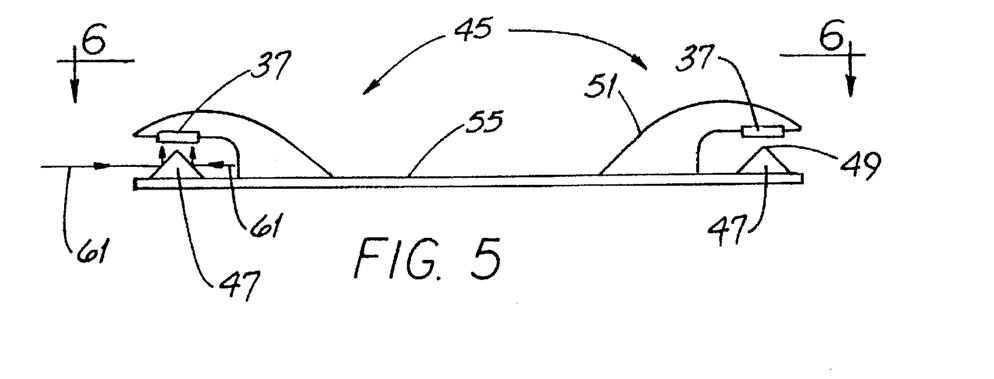
FIG. 5 is a side elevation view of two receivers mounted on a support beam as used on the machine of FIGS. 1 and 2.
Figure 6:
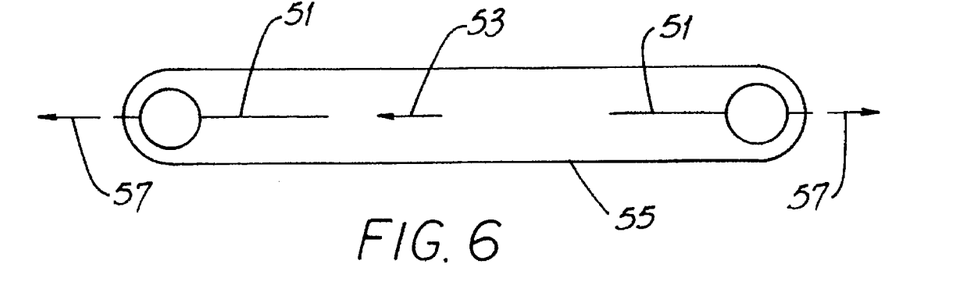
FIG. 6 is a top plan view of the receivers and support beam of FIG. 5 taken generally along the viewing plane 6—6 thereof.

The surface of the body 47 (if not the entire body) is made of a material selected to reflect energy of the locating signal of the type received from the transducers 37 of the beacon 33. Metal or thermoplastics are acceptable. A hard reflecting surface is ideal for either acoustic or radio-wave energy and a surface which is also shiny is preferred for light reflection.

A transducer 37 like that used in the beacon 33 is mounted above and is slightly spaced from the apex 49. With a circular transducer 37 such as the Polaroid transducer, the transducer circle center should be in vertical registry with the apex 49. The transducer 37 is supported by a bracket 51 which is rigid and to avoid significant obstruction of energy received along the direction of the arrow 53, such bracket 51 is also thin.

Figure 7:
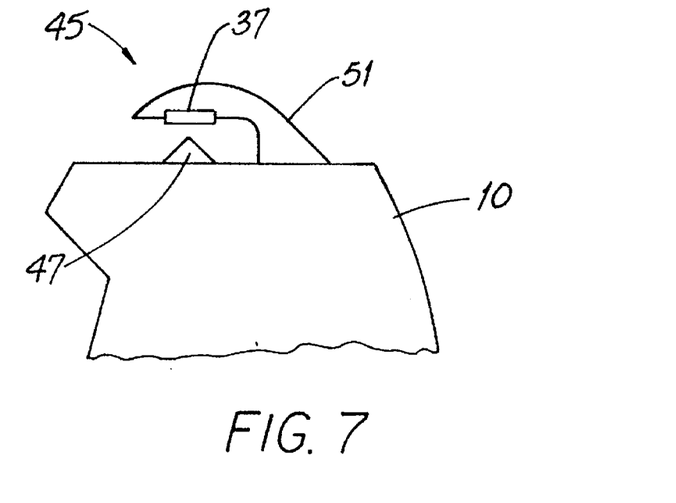
FIG. 7 is a side elevation view of a machine with one receiver. Parts are broken away.

When the preferred "two-receiver, one-beacon" arrangement is used, both receivers 45 are mounted on a support beam 55 attached to the machine 10 and the spacing between receivers 45 is known. A preferred orientation for such beam 55 and for the brackets 51 holding the transducers 37 is parallel to the machine axis as represented by the arrows 57. In turn, such axis is parallel to the "straight line" travel path of the machine 10 as represented by the arrow 59 in FIG. 8. A machine 10 equipped with a single receiver 45 is shown in FIG. 7.

As represented by the arrows 61, energy comprising a locating signal from a beacon 33 strikes the cone body 47 and is reflected upward to impact the transducer 37. The transducer 37 thereupon provides a responsive output signal used to measure time of flight and used to determine when the difference in the time of flight from the beacon 33 to each receiver 45.

Figure 8:
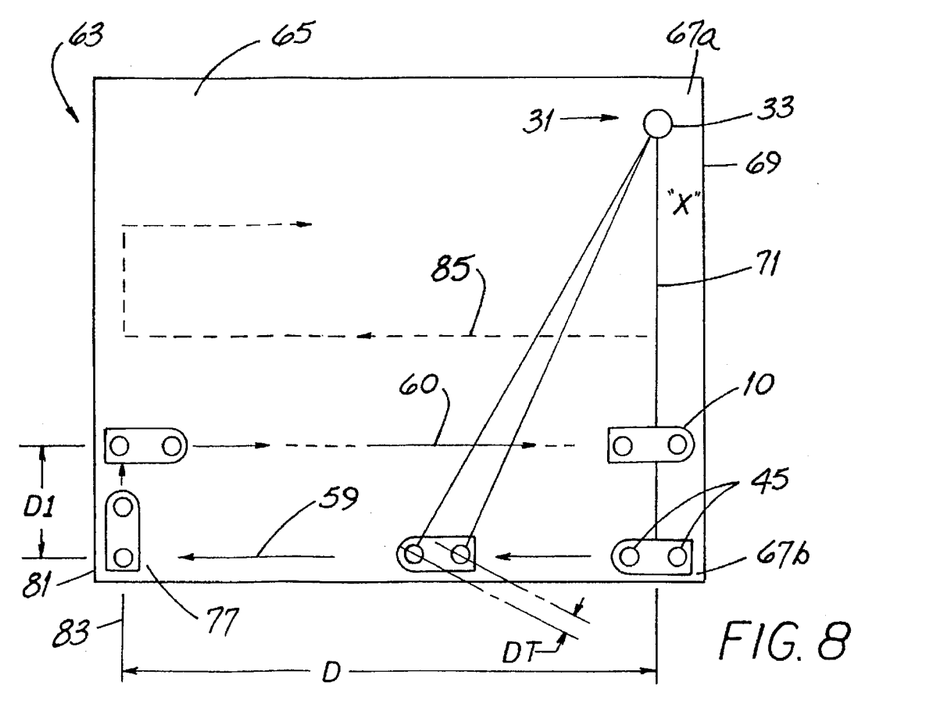
FIG. 8 is a representative top plan view of a room, the carpet of which is to be cleaned by the machine of FIGS. 1 and 2. The illustrated arrangement involves a "one-beacon, two-receiver" system.
Figure 10:
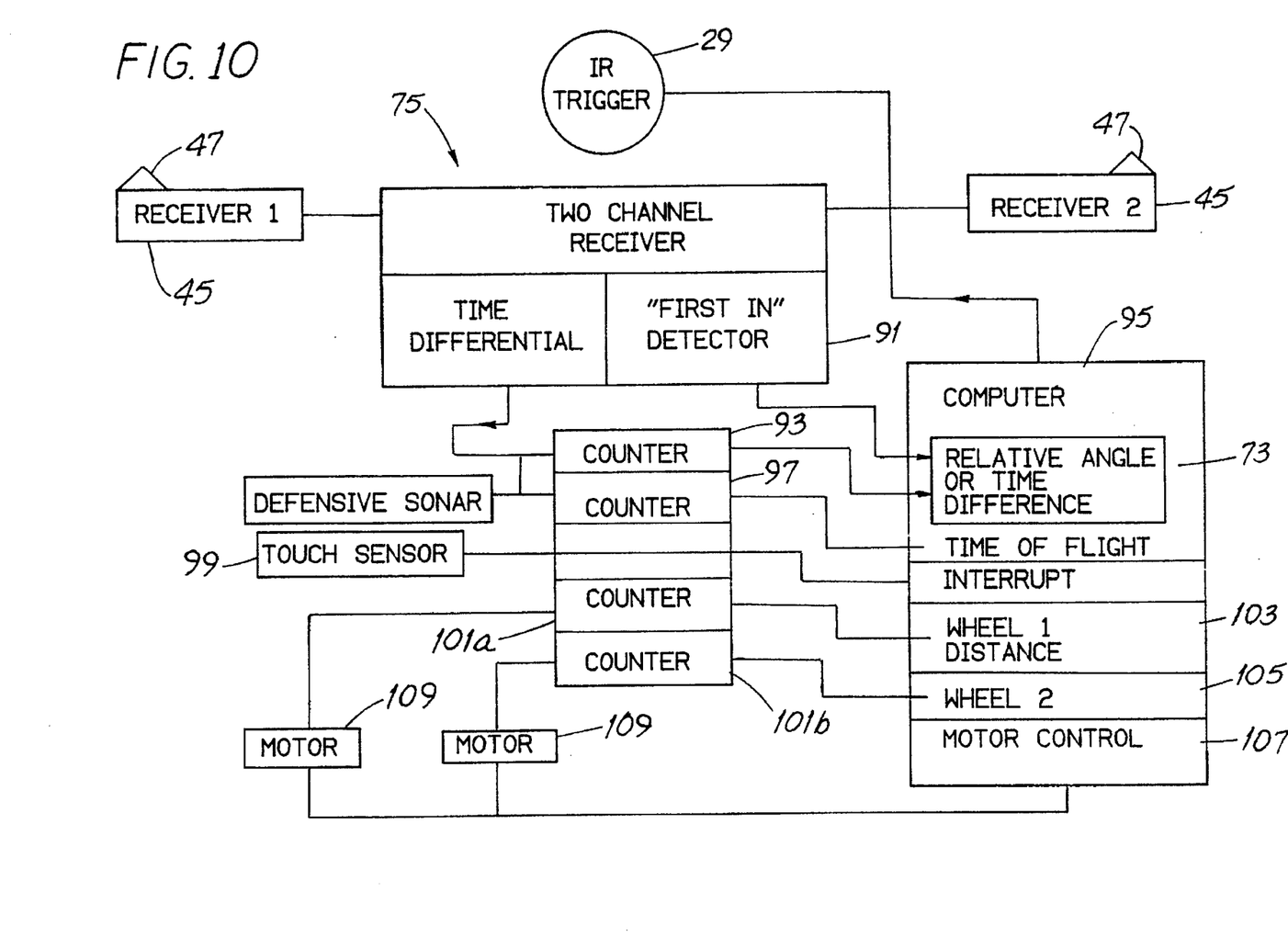
FIG. 10 is a block diagram of a control system used on the machine of FIGS. 1 and 2.

Referring also to FIGS. 8 and 10, operation of a "one-beacon, two-receiver" apparatus will now be described in conjunction with a machine 10 embodied as a carpet cleaning machine being guided in a room 63 for cleaning the carpet 65 therein. The base module 31 includes a single beacon 33 preferably placed in a room corner 67a adjacent to a wall 69. To initiate guidance, the machine 10 is preferably placed in the corner 67b adjacent to the same wall 69 and oriented so that the receiver support beam 55 is generally normal to a line 71 between the beacon and the machine and identified as the "X" axis. Such orientation is by turning the machine 10 until the detected difference in the time of flight from the beacon 33 to each receiver 45 is essentially zero.

The machine transmitter 29 is then caused to transmit a trigger signal which is detected by one or more detectors 43 on the beacon 33. Simultaneously, the time-measuring device 73 is set to zero. In one specific embodiment, the frequency of the trigger signal is about 50 KHz and the duration of such signal is about 16 cycles at that frequency.

If the trigger signal is EMR (light or radio wave energy) as is preferred, the time lapse between transmission from a transmitter 29 and reception by a detector 43 can be assumed to be zero for lengths of the "X" axis of up to even a few thousand feet. It is now apparent why EMR is the preferred energy from the transmitter 29—using such energy avoids having to measure the "time of flight" of the trigger signal and deal with such time of flight in making computations.

When the trigger signal is sensed by a detector 43, the beacon transducers 37 instantly and simultaneously emit a locating signal, preferably of acoustic energy. Because transmission of the trigger signal and emission of the locating signal occur substantially simultaneously, very little error results if such locating signal is assumed to be emitted at "time zero."

When the locating signal is acoustic energy, such signal has a time of flight from the beacon 33 to the receivers 45 which is readily measured by the device 73 since the velocity of sound propagating in air is about 1000 feet per second, very slow compared to the velocity of EMR which is about 186,000 miles per second.

It is to be noted that when the support beam 55 and the machine axis 57 are normal to the "X" axis, the time of flight of the locating signal from the beacon 33 to each of the two receivers 45 will be substantially identical since both receivers 45 are at the same distance from the beacon 33. During this initial setup phase, if such time of flight to each receiver 45 is not the same, the control system 75 is arranged to index the machine 10 slightly until they are the same, thus "squaring up" the machine 10 with the "X" axis and positioning the machine 10 to be intersected by such axis.

It is also to be noted that the aforementioned "squaring up" operation can also be carried out by detecting any difference in the time of flight from the beacon 33 to each receiver 45 and orienting the machine 10 until such difference is zero. In a highly preferred method, the "squaring up" operation is carried out by detecting the aforementioned difference and bringing it to zero rather than by measuring actual times of flight. Such difference is graphically represented by the dimension "DT" between the arrows in FIG. 8.

Once the machine axis 57 is normal to the "X" axis, the beacon 33 is again triggered to emit another locating signal. In this instance, the time of flight of such signal from the beacon 33 to each receiver 45 will be the same. Such time of flight is used to compute the length of the "X" axis.

Thereupon, the machine 10 moves along the travel path 59 until it reaches the location 77. Such machine 10 may "know" it has arrived at such location 77 by any of several means. A highly preferred machine 10 has a tactile bumper 79 which signals when such bumper 79 touches the wall 81. The sonar units 21 may perform the same function or the actual distance "D" along the travel path 59 may be entered into the system 75 and a signal provided when the "count" of the wheel counters indicates the machine 10 has travelled the distance "D."

Yet another alternative involves a "default" value for the distance "D" which will be travelled by the machine 10 if there is no entry of an actual value. However, the default value, say 20 feet, may be more or less than the actual value. (It is to be noted that if the wheels 13 are powered in such a way that their "counts" per unit time are equal, the machine 10 will be caused to follow a straight line.)

When the machine 10 reaches the location 77, it is turned 90° (the counter-revolving wheels and wheel counters execute such turn) and moved a decremental distance "D1" along the line 83. Such line 83 is parallel to the "X" axis. The machine 10 is then again turned 90° and its direction of movement is thereby reversed.

After the machine 10 returns to a position on the "X" axis, it is again turned a total of 180°, "squared up" with the "X" axis as described above and proceeds along the path 85. The machine 10 thereby follows a back-and-forth or raster pattern.

The preferred machine 10 suspends operation when it returns to a position on the "X" axis that is within about 5 feet of the beacon 33. This is possible since the length of such "X" axis was determined initially and the cumulative total of the decremental distances, e.g., D1 and other distances like it, can be subtracted therefrom. (When cleaning carpets 65, the decremental distance is preferably selected so that as the machine 10 follows the path 60, its cleaning "swath" slightly overlaps that which occurred as it travelled along the path 59.)

Figure 9:
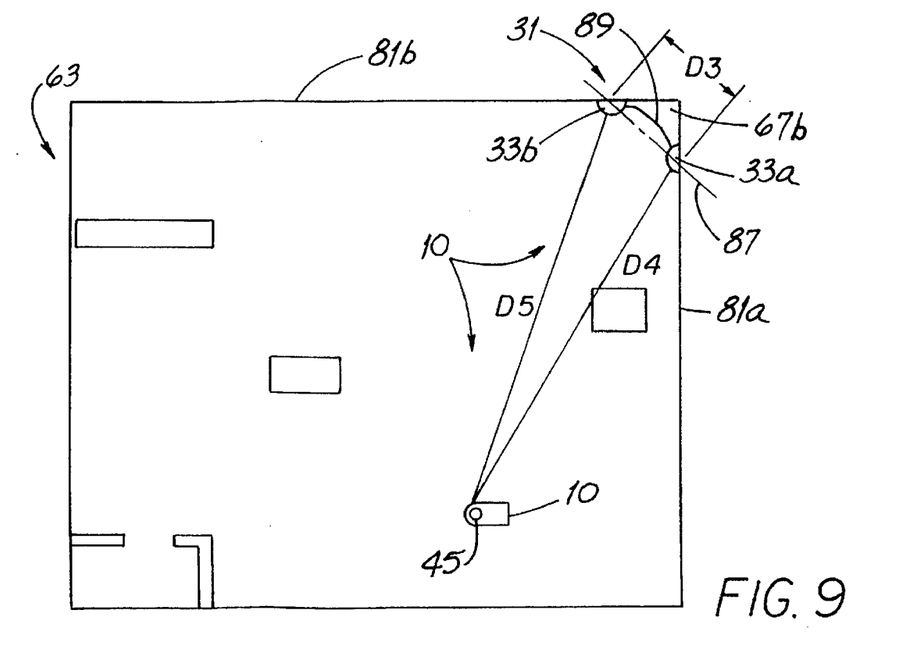
FIG. 9 is a representative top plan view of a room, the carpet of which is to be cleaned by the machine of FIGS. 1 and 2. The illustrated arrangement involves a "two-beacon, one-receiver" system.

Referring next to FIG. 9, a two-beacon, one-receiver apparatus 10 will now be described. In the arrangement of FIG. 10, the base module 31 includes two beacons 33 adjacent to the corner 67b of a room 63 and spaced apart by a known distance "D3." Such beacons 33 are on a line 87 which is at 45° to either wall 81a, 81b and are electrically connected together by a wire 89.

A single receiver 45 is mounted on the machine 10 and such machine 10 includes the transmitter 29 described above. When the machine-mounted transmitter 29 emits a trigger signal, the first beacon 33a responds instantly with a first locating signal. A predetermined time thereafter, e.g., 0.2 seconds, the first beacon 33a triggers the second beacon 33b and the latter responds with a second locating signal. Preferably, such locating signals are relatively slow-moving acoustic signals and both such signals are received in sequence by the receiver 45.

It is to be appreciated that since the times of flight of each locating signal from its emitting beacon 33a, 33b to the receiver 45 can readily be determined, so can the distances "D4" and "D5" be readily determined. And since the distance "D3" is known, the precise locus of the receiver 45 (and therefore of the machine 10) can be readily computed. More importantly, an equation-based computer program can be written to guide the machine 10 along virtually any desired path.

Referring also to FIG. 10, the block diagram of the control system 75 for a two-receiver, one-beacon apparatus will now be described. Such system 75 includes the IR "triggering" transmitter 29 which causes a beacon 33 to emit a responsive locating signal. Such signal is detected by the receivers 45 and the detector 91 indicates which receiver 45 was the first to receive such signal. The device 73 measures the time elapsed between the instant of reception at one receiver 45 and the instant of reception at the other receiver 45.

The counter 93 converts such elapsed time into a "count" used by the computer 95 to ascertain time difference (in a two-receiver apparatus) or angle information in a one-receiver apparatus. The counter 97 is connected to the "front-looking" sonar units 21 for distance measurement.

The touch sensor 99 is attached to the bumper 79 and when such sensor 99 contacts an obstacle such as a wall, for example, it causes an "interrupt" which shuts down the machine 10. The counters 101a, 101b are connected to quadrature wheel encoders 103 and 105, respectively, and provide a numerical count representing the distance travelled by each of the two wheels 13. (Such distance can be readily computed, of course, assuming the circumference of the wheels 13 is known.) The motor control 107 unit powers the wheel motors 109 as commanded by the computer 95.

The high degree of application flexibility is an advantage of the two-beacon, one-receiver arrangement. Such arrangement is well suited for machines 10 working in open areas not bounded by walls. Another advantage is that the wheel counters 101a, 101b need not be provided on the machine 10. A disadvantage is that the system 75 is more complex than that involving the one-beacon, two-receiver arrangement.

While the invention has been shown and described in connection with specific embodiments, it is to be understood clearly that such embodiments are by way of example and are not limiting. For example, transmitters 29 and receivers 45 may be embodied as acoustic speakers and microphones. And instead of having an IR light transmitter "trigger" a base module 31, both the transmitter 29 and the base module 31 could be synchronized to the same master clock or to the AC line, the latter if both are connected to the AC line. Yet another way to synchronize such transmitter 29 and base module 31 is to electrically couple both to a common line used for synchronizing.

What is claimed:

1. A method for automatically guiding a self-propelled carpet cleaning machine moving within a room and including the steps of:

transmitting an airborne trigger signal of electromagnetic radiation from the moving machine to a stationary base module and, simultaneously with such transmitting, starting a counter on the machine;

propagating, in response to the trigger signal, an acoustic locating signal from the base module to the machine;

computing the distance between the base module and the machine; and using the computed distance to adjust the course of the machine along a raster path.

2. The method of claim 1 wherein the machine includes a time-measuring device and the transmitting step also includes setting the device at zero elapsed time.

3. The method of claim 1 wherein the computing step includes computing the time of flight of the locating signal from the base module to the machine.

4. The method of claim 3 wherein the machine includes a time-measuring device and the time of flight of the locating signal is computed by the device.

5. The method of claim 1 wherein the machine includes first and second receivers for detecting a signal from the base module and the method includes the steps of:

determining a first time of flight of the locating signal from the base module to the first receiver; determining a second time of flight of the locating signal from the base module to the second receiver; and computing the difference between the times of flight.

6. The method of claim 5 wherein:

the receivers define a machine axis;

a base axis extends between the base module and the machine, and the method includes the step of:

orienting the machine axis at a known angle with respect to the base axis.

7. The method of claim 6 wherein the orienting step includes moving the machine until the difference between the times of flight is substantially zero and the angle is substantially 90°.

8. The method of claim 7 including the step of determining the distance between the machine and the base module.

9. The method of claim 6 wherein the machine axis is parallel to a travel path when the machine axis is at a known angle with respect to the base axis and the method includes the steps of:

moving the machine along the travel path;

turning the machine;

moving the machine a decremental distance along a line substantially parallel to the base axis; and turning the machine, thereby reversing the direction of machine movement.

10. The method of claim 9 followed by the step of moving the machine to a location at which the machine axis is again at the known angle with respect to the base axis.

11. The method of claim 1 wherein the base module includes first and second base units and the triggering step includes:

triggering a first locating signal from the first base unit to the machine;

triggering a second locating signal from the second base unit to the machine.

12. The method of claim 11 wherein the second locating signal is triggered following a predetermined time delay after triggering the first locating signal.

13. The method of claim 12 wherein the first and second base units are electrically connected together and the second locating signal is triggered by the first base unit.

14. An apparatus for automatically guiding a self-propelled carpet cleaning machine moving within a room, such apparatus including:

a trigger device on the machine for emitting an airborne trigger signal of electromagnetic radiation;

a stationary base module for receiving the trigger signal and responsively transmitting an acoustic airborne locating signal;

a receiver on the machine for receiving the locating signal; and a measuring device on the machine for determining the time elapsed between transmitting the locating signal and receiving such locating signal.

15. The apparatus of claim 14 including first and second receivers receiving the locating signal and wherein:

the measuring device also determines the time difference between the instant at which the locating signal is received by the first receiver and the instant at which the locating signal is received by the second receiver.

16. The apparatus of claim 14 wherein the receiver comprises:

a cone-shaped reflector having an apex; and a signal sensor mounted at the apex for receiving signals from the reflector.

17. In combination, a carpet cleaning machine and an apparatus for guiding the machine, the apparatus including:

a trigger device for emitting a trigger signal;

a base module for receiving the trigger signal and transmitting a locating signal;

a receiver receiving the locating signal; and a measuring device for determining the time elapsed between transmitting the locating signal and receiving such locating signal;

and wherein:

the trigger device, the receiver and the measuring device are mounted on the machine; and the receiver comprises a cone-shaped reflector having an apex and a signal sensor mounted at the apex for receiving signals from the reflector.

* * * * *